Figure 3:
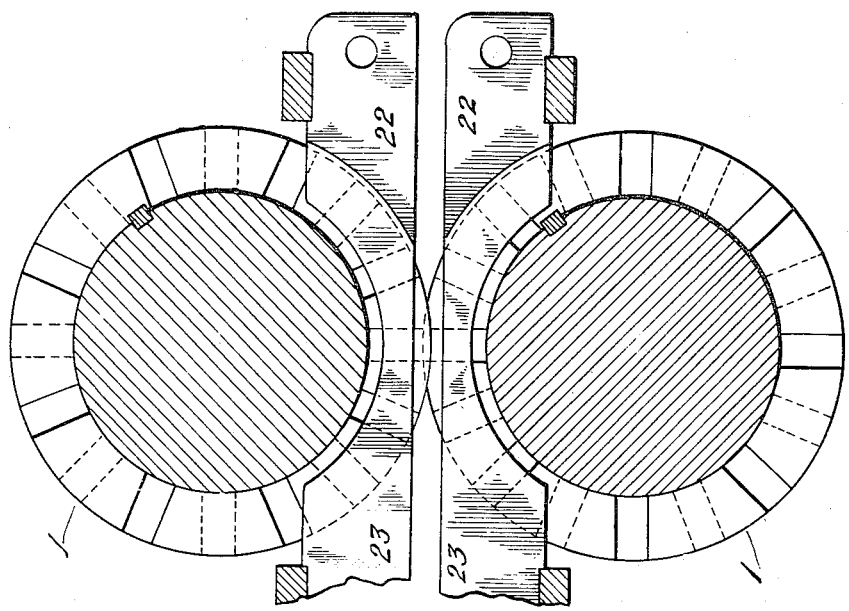

Oct. 30, 1923.
H. M. NAUGLE ET AL
1,472,770
STEEL JOIST MANUFACTURE
Filed May 20, 1921    9 Sheets-Sheet 1
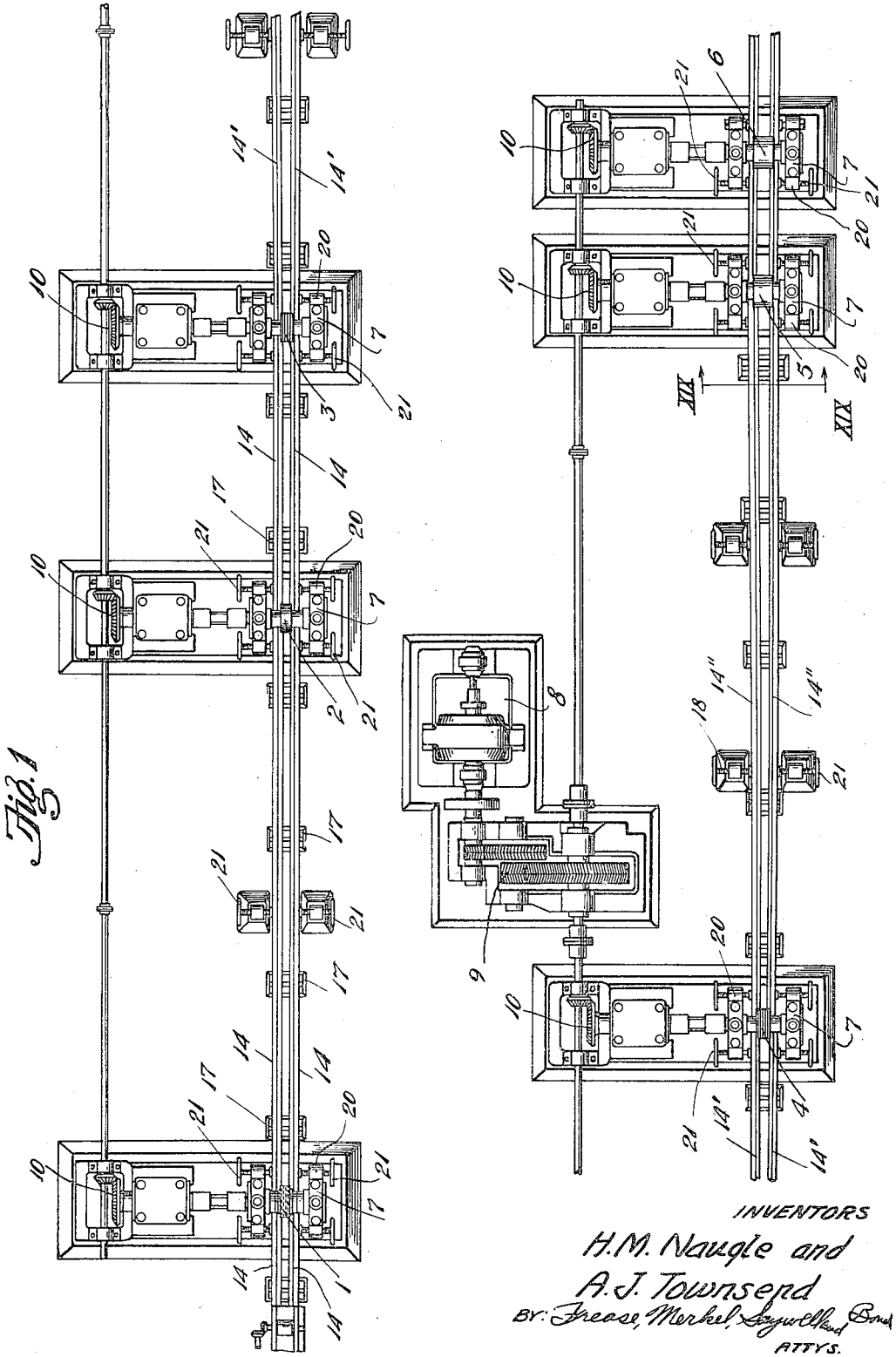
INVENTORS
H.M. Naugle and
A.J. Townsend
BY: Frease, Merkel, Laywell and Bond
ATTYS.

Oct. 30, 1923.

H. M. NAUGLE ET AL 1,472,770

STEEL JOIST MANUFACTURE

Filed May 20, 1921   9 Sheets—Sheet 2

INVENTORS
H. M. Naugle and
A. J. Townsend
BY Freas, Merkel, Saywell and Bond
ATTYS.

Oct. 30, 1923.
H. M. NAUGLE ET AL
1,472,770
STEEL JOIST MANUFACTURE
Filed May 20, 1921 9 Sheets-Sheet 4
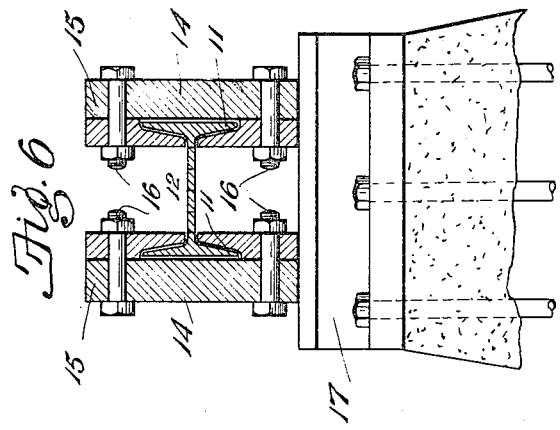
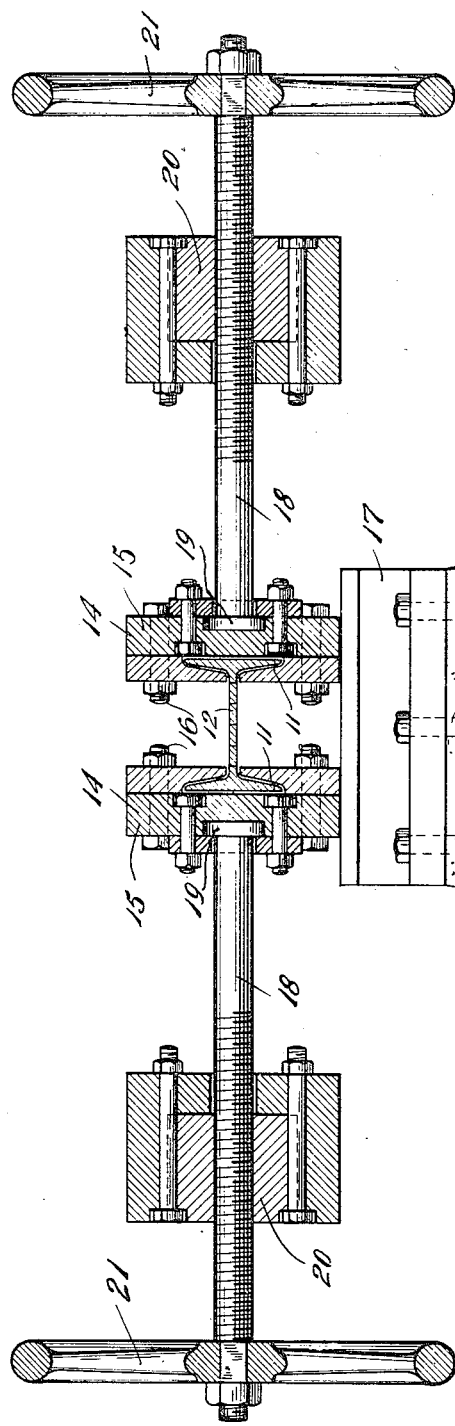
INVENTORS
*H.M. Naugle and
A.J. Townsend*
BY *Trease, Merkel, Saywell and Bond*
ATTYS.

Oct. 30, 1923.

H. M. NAUGLE ET AL 1,472,770

STEEL JOIST MANUFACTURE

Filed May 20, 1921    9 Sheets-Sheet 5

INVENTORS
H. M. Naugle and
A. J. Townsend
ATTYS.

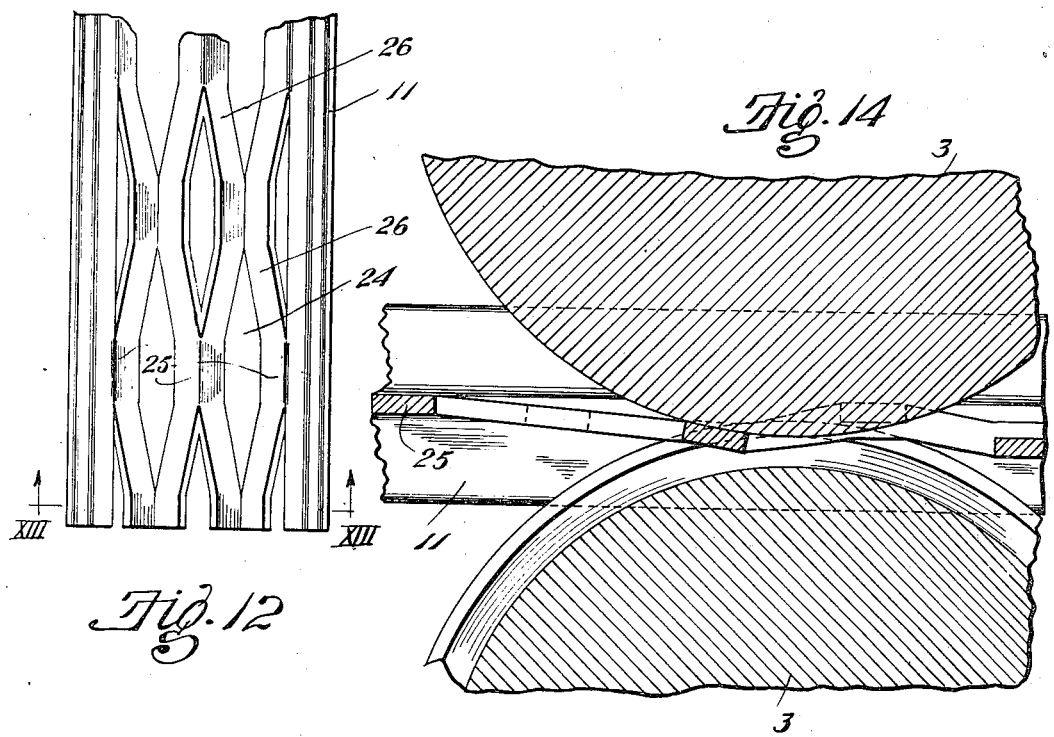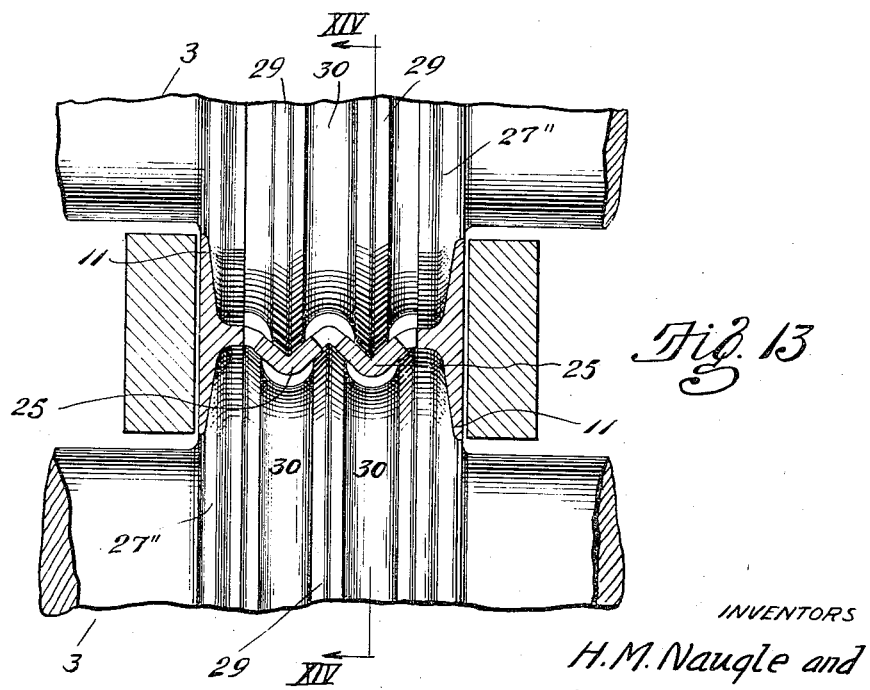

Oct. 30, 1923. 1,472,770
H. M. NAUGLE ET AL
STEEL JOIST MANUFACTURE
Filed May 20, 1921 9 Sheets-Sheet 7

INVENTORS
H. M. Naugle and
A. J. Townsend
ATTYS.

Oct. 30, 1923.

H. M. NAUGLE ET AL 1,472,770

STEEL JOIST MANUFACTURE

Filed May 20, 1921   9 Sheets-Sheet 8

Inventors
H. M. Naugle and
A. J. Townsend
Attorneys

Oct. 30, 1923.

H. M. NAUGLE ET AL 1,472,770

STEEL JOIST MANUFACTURE

Filed May 20, 1921

9 Sheets-Sheet 9

Inventors
H. M. Naugle and
A. J. Townsend

Attorneys

Patented Oct. 30, 1923.

1,472,770

UNITED STATES PATENT OFFICE.

HARRY M. NAUGLE AND ARTHUR J TOWNSEND, OF CANTON, OHIO, ASSIGNORS, BY DIRECT AND MESNE ASSIGNMENTS, TO JONES AND LAUGHLIN STEEL COMPANY, OF PITTSBURGH, PENNSYLVANIA, A CORPORATION OF PENNSYLVANIA.

STEEL-JOIST MANUFACTURE.

Application filed May 20, 1921. Serial No. 471,295.

*To all whom it may concern:*

Be it known that we, HARRY M. NAUGLE and ARTHUR J. TOWNSEND, citizens of the United States, residing at Canton, in the county of Stark and State of Ohio, have invented a new and useful Improvement in Steel-Joist Manufacture, of which the following is a specification.

The invention relates to methods and apparatus for making steel joists and the like, for use in building construction in places where standard rolled structural shapes may not be used because of the excessive weight or improper distribution of the metal therein.

A standard rolled beam cannot be economically used as a floor joist or like member in building construction, because the limitations of rolling methods prevent the web portions being reduced to a thickness which would correspond in strength and rigidity to the resistance of the flange portions, so that there is an unnecessary weight of metal in the web.

Likewise, in the ordinary forms of steel joists, made of pressed channels with their webs abutted and secured together, the double thickness of the web portions gives an unnecessary weight of metal therein, as compared with the strength of the flange portions.

The present invention involves the expansion of the web portion of a rolled I-beam or other structural shape into an integral lattice portion; in such a manner that the strength of the lattice will be co-ordinated with that of the flanges without any excess metal being present in any portion of the beam.

The expansion of the web between the flanges of a rolled beam, necessarily requires a stretching or elongating of the bars of the lattice portion, because the length of the flanges cannot be contracted; and a stretching of bars effected by a lateral separation of the flanges without preliminary treatment of the lattice portion, can only be accomplished to a limited extent.

The object of the present improvement is to expand the web by slitting and stretching or otherwise elongating a plurality of rows of bars connected by bonds, and the formation of one or more rows of rectangular or hexagonal lattice openings, the particular shape of the openings depending upon the length of the bonds; and a further object of the improvement is to stretch the bars by the displacement of alternate rows of bonds from the plane of the intervening rows thereof, followed by a flattening of the bonds and bars to the original plane of the web.

A further purpose of the improvement is to perform the operations of cutting the slits, deflecting the bonds, elongating the bars, forming the lattice, and flattening the same by a single continuous movement of the material, and without shortening or distorting the flanges of the beam.

The accompanying drawings, forming part hereof, illustrate the method and show apparatus for expanding the web of a rolled I-beam, by slitting four rows of bars and forming three rows of hexagonal openings.

Figure 2:
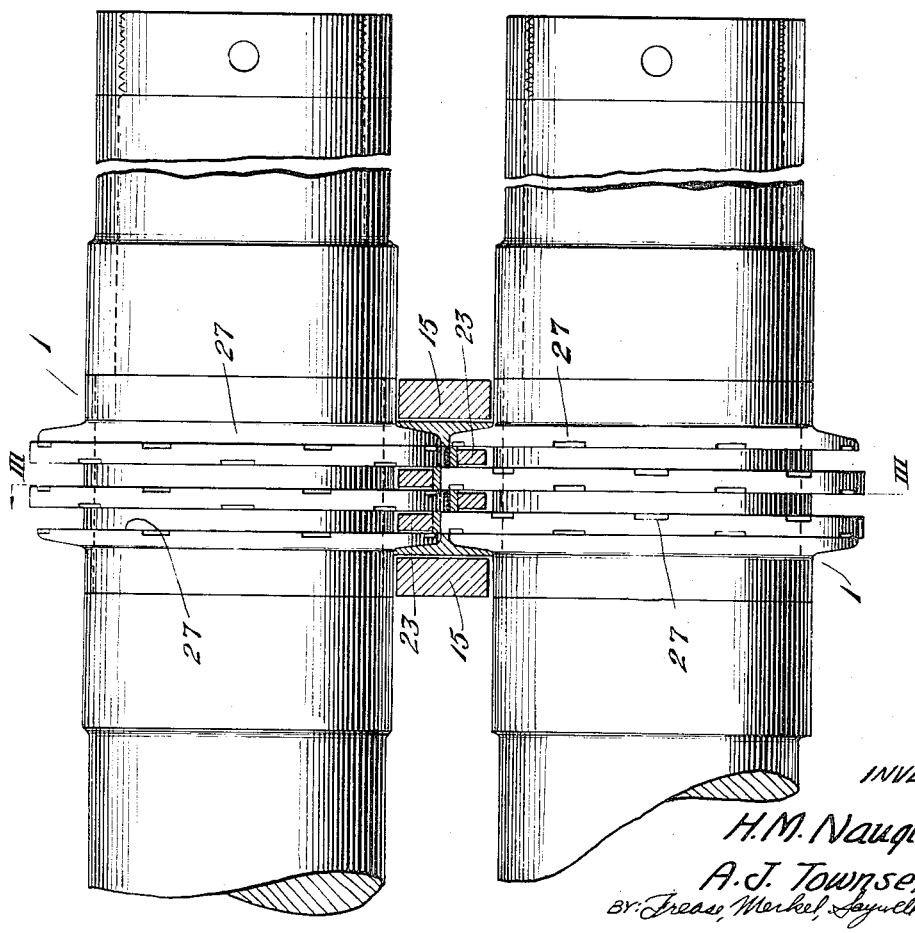
Figure 4:
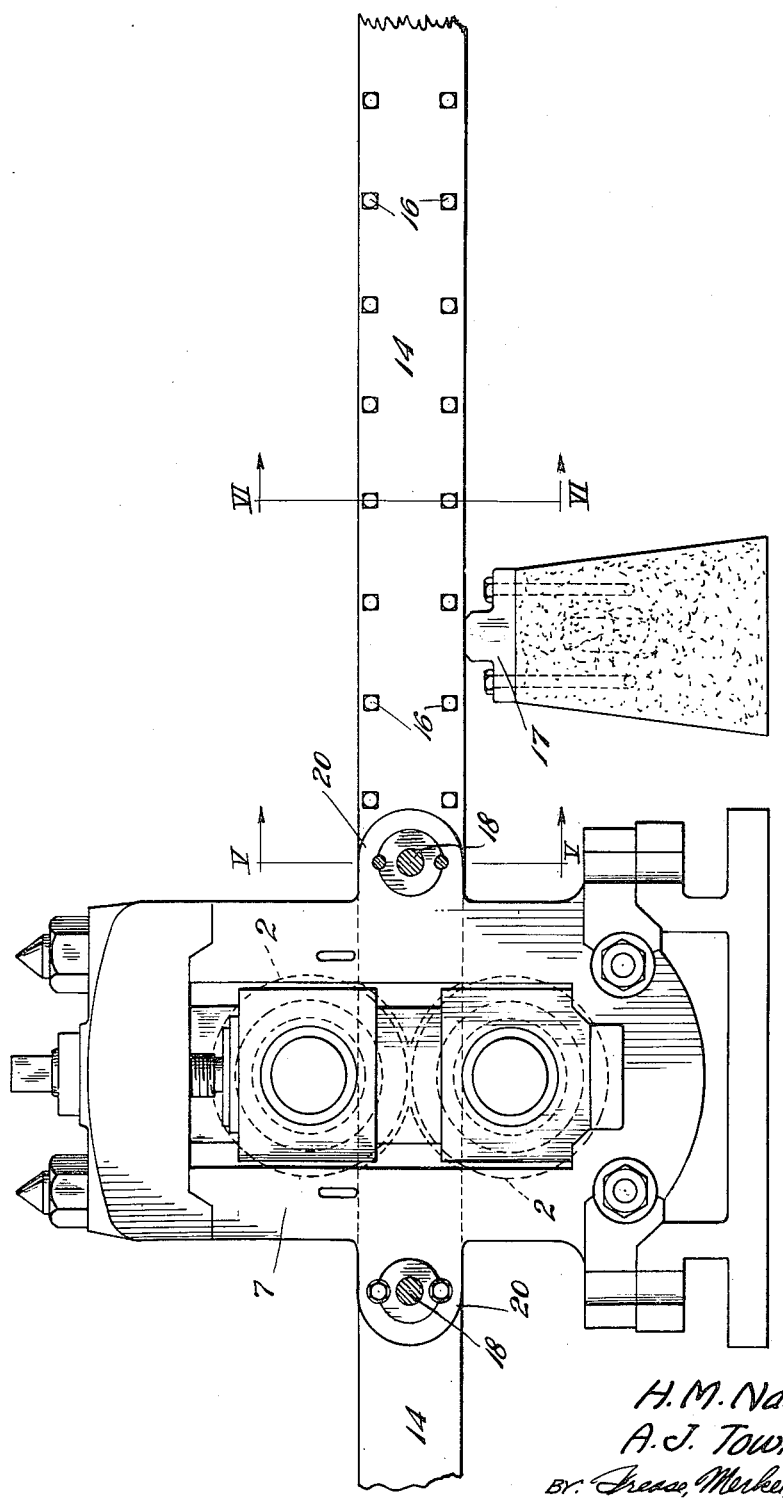
Figure 7:
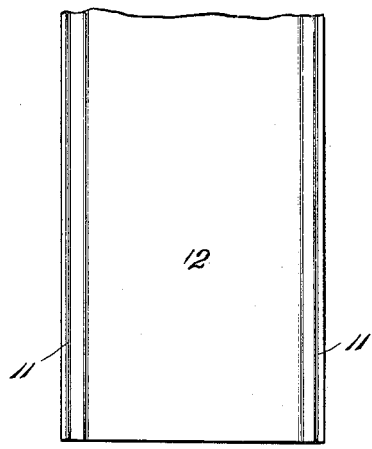
Figure 9:
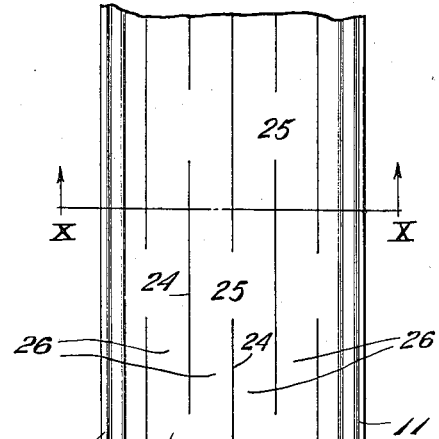
Figure 8:
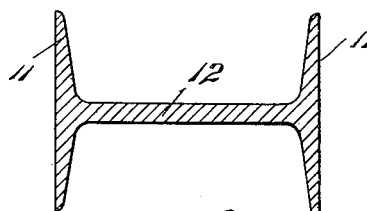
Figure 10:
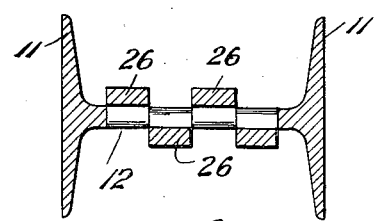
Figure 11:
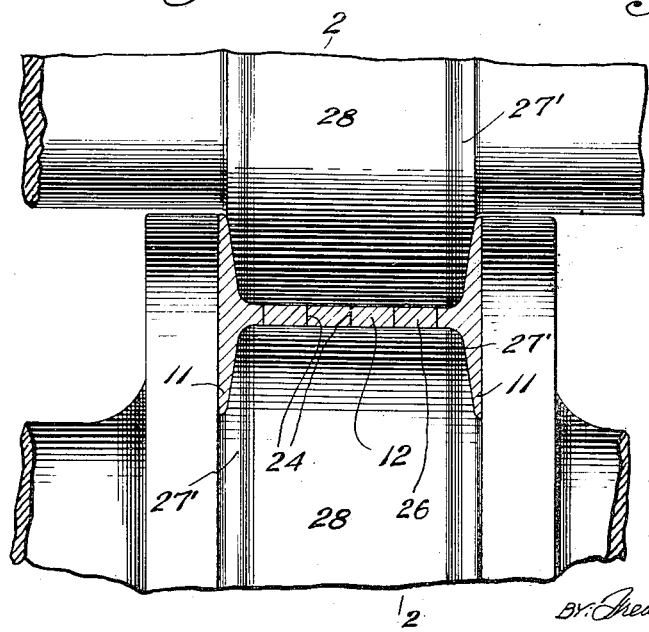
Figure 15:
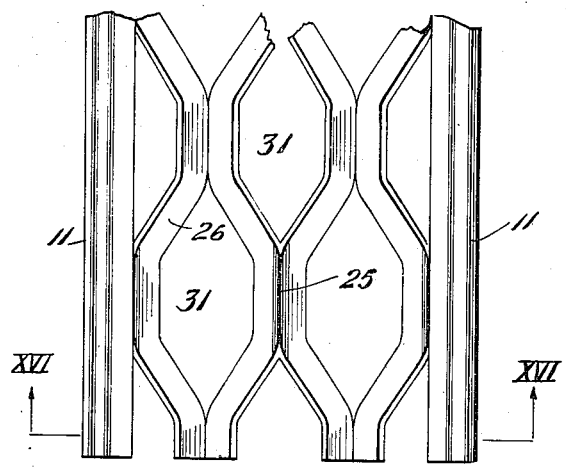
Figure 17:
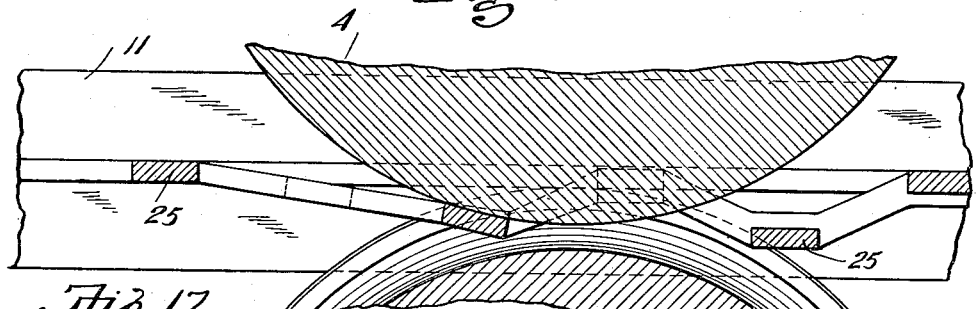
Figure 16:
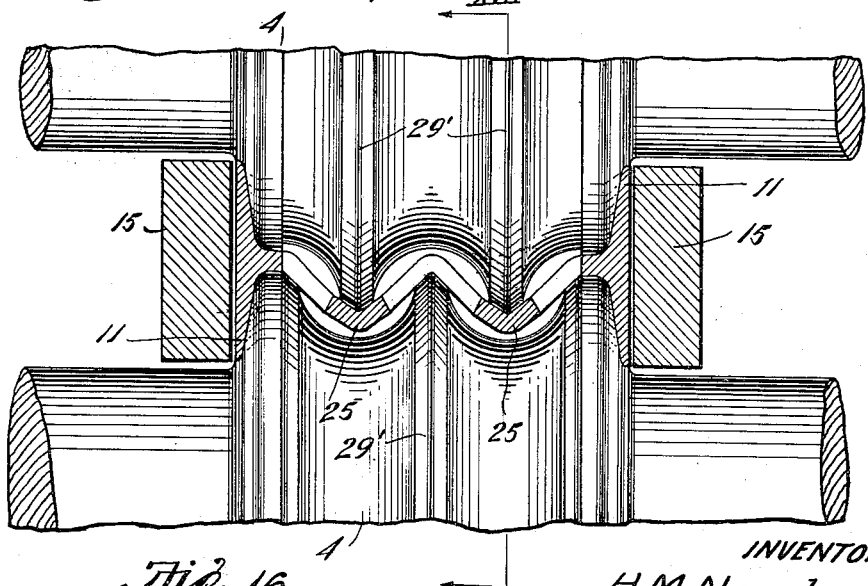
Figure 18:
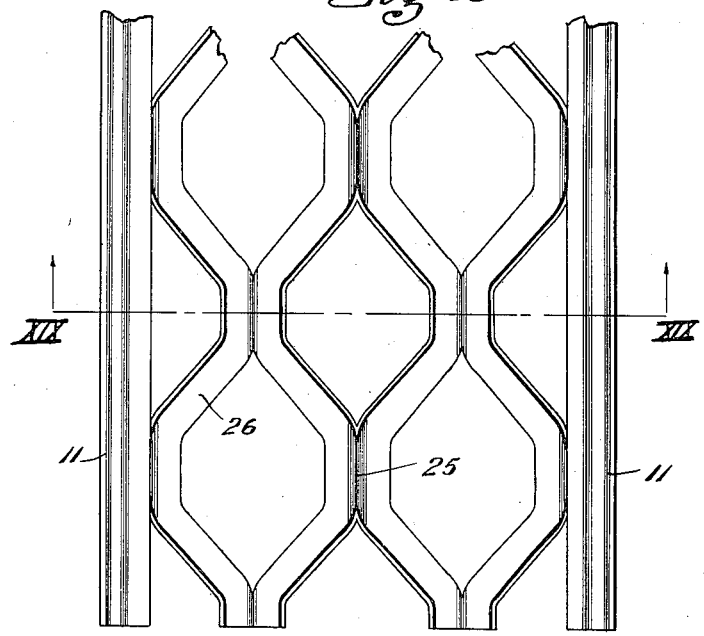
Figure 19:
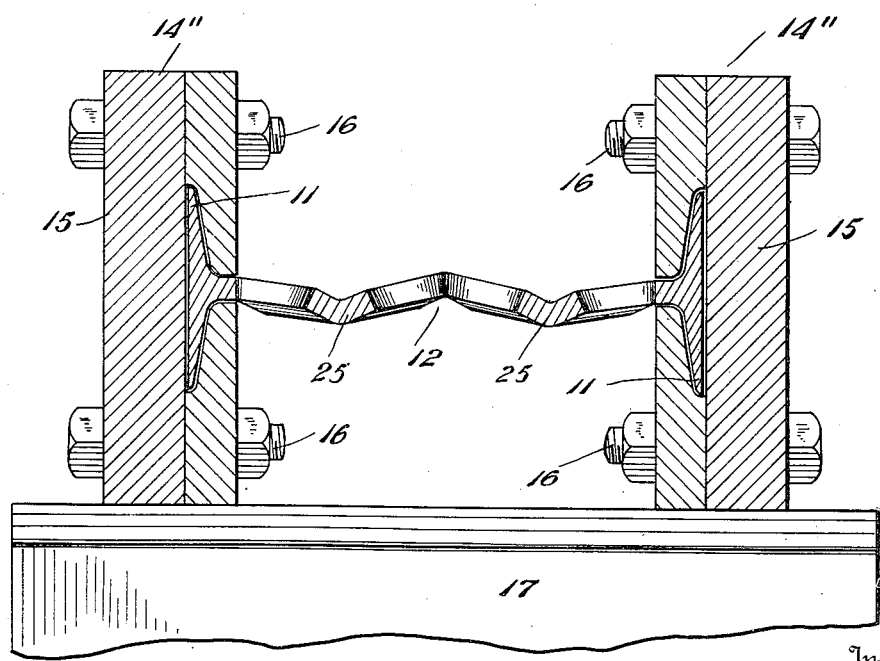
Figure 20:
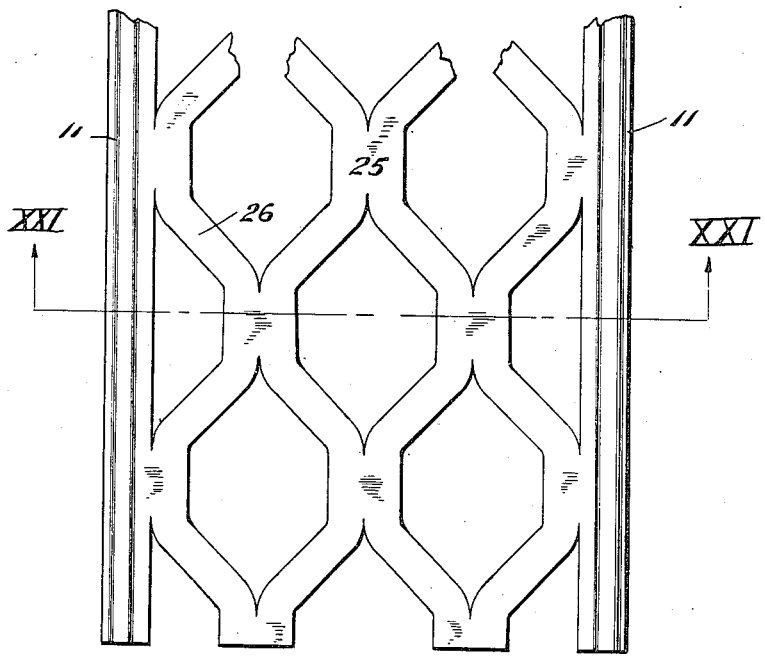
Figure 21:
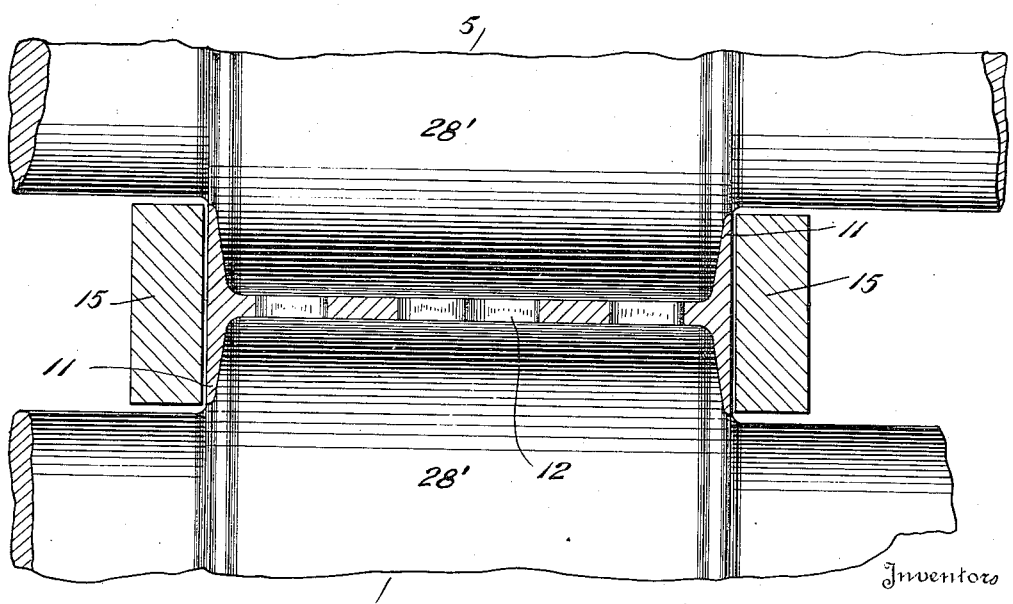

Referring to the drawings, Figure 1 is a diagrammatic plan view, in two sections, of the apparatus;

Fig. 2, a fragmentary elevation of the slitting rolls;

Fig. 3, a section of same on line III—III, Fig. 2;

Fig. 4, a side elevation of the bar flattening rolls showing the guides extending therefrom;

Fig. 5, a section on line V—V, Fig. 4;

Fig. 6, a section on line VI—VI, Fig. 4;

Fig. 7, a fragmentary side plan of an I-beam;

Fig. 8, a cross section of same;

Fig. 9, a plan of same, showing the web slit to form bars;

Fig. 10, a section of same on line X—X, Fig. 9;

Fig. 11, a fragmentary elevation of the bar flattening rolls, showing an I-beam in section with the web slit and flattened:

Fig. 12, a fragmentary side plan of the beam showing the bonds corrugated, and the bars slightly stretched and separated;

Fig. 13, a fragmentary elevation of the corrugating rolls, showing a beam in section, as on line XIII—XIII, Fig. 12;

Fig. 14, a fragmentary section of the corrugating rolls, as on line XIV—XIV, Fig. 13, showing the operation of corrugating the bonds;

Fig. 15, a fragmentary side plan of the beam, showing the initial expansion of the web;

Fig. 16, a fragmentary elevation of the stretching rolls, showing in section, the initially expanded web, as on line XVI—XVI, Fig. 15;

Fig. 17, a fragmentary section of the stretching rolls, as on line XVII—XVII, Fig. 16, showing the operation of fully stretching the bars;

Fig. 18, a fragmentary side plan of the beam, showing the lattice fully expanded;

Fig. 19, a section of the expanding guides as on line XIX—XIX, Fig. 1, showing the fully expanded lattice, as on line XIX—XIX, Fig. 18;

Fig. 20, a fragmentary side plan of the beam with the fully expanded lattice finally flattened; and Fig. 21, a fragmentary elevation of the lattice flattening rolls, showing the beam in section, as on line XXI—XXI, Fig. 20.

Similar numerals refer to similar parts throughout the drawings.

The apparatus may include slitting rolls 1, bar flattening rolls 2, bond corrugating rolls 3, bar stretching rolls 4, lattice flattening rolls 5, and delivery rolls 6; all of which rolls may be mounted in suitable housings 7, and arranged to be continuously driven at the proper speed by a motor 8 and gearings 9 and 10.

The beam blank shown in Figs. 7 and 8, may have flanges 11 rolled with a web 12, which web may be and preferably is somewhat thicker than in a standard structural shape. The beam may be received directly from the table rolls 13 of a rolling mill at a working temperature of say 1500° F. A cold beam may be reheated to a working temperature, or light sections may be worked cold.

Parallel guides 14 may engage the flanges 11 of the beam for properly directing it to the slitting rolls, and like parallel guides for engaging and directing the flanges extend from the slitting rolls 1 to the bar flattening rolls 2, and also from the bar flattening rolls to the bond corrugating rolls 3. As shown in Figs. 5 and 6, these guides may each comprise a base plate 15 abutting the flat outer face of the flange, and two plates having lateral tongues fitting the inclined inner faces of the flange, the plates being clamped together by bolts 16.

The guides 14 may rest and slide laterally upon pedestals 17, and are adjusted and secured in proper lateral position for beams of various depths, by means of screw shanks 18 having heads 19 swivelled in the base plates 15, operating in screw bearings 20 secured in the housings 7, and having hand wheels 21 on their outer ends.

The slitting rolls may be of any well known type, and as shown are provided with stripper plates 22 mounted between spacer plates 23. These rolls cut the web with series of laterally spaced interrupted slits 24, with intervening bonds 25; and the slitting operation displaces the bars 26 formed thereby, to one side or the other of the original plane of the web, as shown in Fig. 10.

The slitting rolls are preferably formed with inclined ends 27 operating against the inner inclined faces of the beam flanges; and the base bars 15 of the guides 14 are preferably extended continuously through between the rolls so as to positively control the movements of the flanges.

The operation of the slitting rolls drives the beam forward to the bar flattening rolls 2, which are provided with inclined ends 27' for engaging the beam flanges, and the cylindric faces 28 of these rolls, compress the slitted portion of the web into the original plane thereof, as shown in Fig. 11; in which form the beam is fed forward, and is directed by the parallel guides 14, to the bond corrugating rolls 3.

The bond corrugating rolls 3 are preferably provided with inclined ends 27'' for engaging the inner faces and adjacent portions of the web of the beam for propelling the same; and upon the faces of the rolls, are formed a series of annular flanges 29, preferably having V-shaped peripheries, which are spaced to impinge the opposite sides of alternate series of bonds 25 between the interrupted slits 24 of the web, so as to form reversely V-shaped corrugations in the alternate series of bonds, and to correspondingly incline and slightly stretch the bars, as shown in Figs. 12, 13 and 14.

The peripheries of the flanges may be so proportioned that the angle of one series of corrugated bonds will remain in the original plane of the web, while the other series of corrugated bonds and the intervening bars will be deflected to one side thereof, as shown in Figs. 13 and 14. The width of the flanges is preferably such that their sides do not overlap, and grooves 30 are preferably provided between the adjacent flanges 29, free from contact with the co-acting flanges, so that the bonds and bars are not pressed between them.

The operation of the corrugating flanges slightly opens the slits at the sides of each bond, as shown in Figs. 12 and 13, and serves to straight stretch the bars by tension to elongate them longitudinally equal to the increased distance between the deflected bonds.

Upon leaving the bond corrugating rolls, the beam continues forward to the bar stretching rolls 4, and in passing from the corrugating to the stretching rolls, the flanges of the beam are engaged by the laterally diverging guides 14', which may be made, mounted and adjusted like the parallel guides 14; and as the beam is driven forward, the divergence of the guides 14' separates the flanges laterally and thereby deploys the corrugated bonds and stretched bars to form hexagonal or rectangular lattice openings 31 of the width shown in Fig. 15.

This slight expansion of the web is permitted by a turn of the deflected bonds and a straightening of the stretched bars toward the original plane of the web, thus bringing the corrugated bonds and inclined bars back toward the same or common plane; which action may be accompanied by a slight flattening of the corrugated bonds and the corresponding inclination of the bars, thereby reducing the thickness of the slightly expanded web.

The bar stretching rolls 4 are formed and operate substantially the same as the bond corrugating rolls 3, the only difference being an increased lateral spacing between the flange dies 29' to bring them in proper position for operating in the corrugations of the partially deployed bonds and bars.

These rolls operate to deepen the corrugations which have been somewhat flattened by the slight expansion, by deflecting alternate series of bonds from the plane of the intervening series of bonds, thereby stretching the bars by a longitudinal tension to the increased length of the distance between the deflector bonds; and this operation may be accompanied by a corresponding increase in the angle of the corrugations and the inclination of the stretched bars, to shape the same in the form shown in Fig. 16.

The beam continues forward to the lattice flattening rolls 5, and between the stretching and flattening rolls, the flanges are engaged by diverging guides 14'', which operate like the diverging guides 14', to further separate the flanges and deploy the corrugated bonds and stretched bar to form rectangular or hexagonal lattice openings of the width shown in Fig. 18, as the beam enters the final flattening rolls; which expansion is made in substantially the same manner as described for the slight initial expansion.

The lattice flattening rolls 5 are formed and operate substantially the same as the bar flattening rolls 2, except that the width of their cylindric faces 28' corresponds to the increased width of the expanded web; and these rolls operate to compress and flatten the corrugated bonds and inclined bars of the lattice back into the original plane of the web, as shown in Fig. 21, which is the final and finished form of the beam.

The particular size and shape of the openings thus formed in the expanded web by the oblique lattice bars, depends upon the length of the slits and the relative length of the bonds; and the number of rows of openings depends upon the number of rows of bars as determined by the number of rows of slits.

By thus expanding the web of a structural shape, the strength and rigidity of the web portion can be made to correspond exactly to the resistance of the flange portions, without any excess in the weight of metal in the expanded web portion; thereby enabling structural steel shapes to be used economically in place of wood structural members in building construction.

The steel joist machine described but not claimed herein, is made the subject of a divisonal application filed June 24, 1921, Serial No. 480,143; and the metal beam described but not claimed herein, is made the subject of another divisional application filed June 24, 1921, Serial No. 480,144.

We claim:—

1. The method of expanding the web of a structural shape or the like slit to form bars, which includes the operations of elongating the bars, then laterally deploying the same, and then flattening the bars to the plane of the web.

2. The method of expanding the web of a structural shape or the like slit to form bars and bonds, which includes the operations of stretching the bars by deflecting the bonds, then laterally deploying the same, and then flattening the bars and bonds to the plane of the web.

3. The method of expanding the web of a structural shape or the like slit to form bars and bonds, which includes the operations of stretching the bars by longitudinally corrugating the bonds, then laterally deploying the same, and then flattening the bars and bonds to the plane of the web.

4. The method of expanding the web of a structural shape or the like slit to form bars, which includes a series of operations for stretching the bars each followed by a lateral deployment of the same, then flattening the bars to the plane of the web.

5. The method of expanding the web of a structural shape or the like slit to form bars and bonds, which includes a series of operations for stretching the bars by deflecting the bonds each followed by a lateral deployment of the same, and then flattening the bars and bonds into the plane of the web.

6. The method of expanding the web of a structural shape or the like slit to form bar and bonds, which includes a series of operations for stretching the bars by longitudinally corrugating the bonds each followed by a lateral deployment of the same, and then flattening the bars and bonds to the plane of the web.

7. The method of expanding the web of a structural shape or the like, which consists in slitting the web lengthwise to form bars, then flattening the same, and then stretching the bars longitudinally and inclining them laterally to permit spreading said shape by separating its edges.

8. The method of expanding the web of a structural shape or the like, which consists in slitting the web lengthwise to form bars, then flattening the same, and then stretching the bars longitudinally and inclining them laterally, progressively from end to end followed by separating the edges of said shape.

9. The method of expanding the web of a structural shape or the like, which consists in slitting the web to form bars, then flattening the bars into the plane of the web, then elongating the bars, then laterally deploying the same, and then flattening the bars into the plane of the web.

10. The method of expanding the web of a structural shape or the like, which consists in slitting the web to form bars with staggered connecting bonds, then flattening the same into the plane of the web, then stretching the bars by deflecting the bonds, then laterally deploying the same, and then flattening the bars and bonds into the plane of the web.

11. The method of expanding the web of a structural shape or the like, which consists in slitting the web to form bars with staggered connecting bonds, then flattening the same into the plane of the web, then stretching the bars by corrugating the bonds, then laterally deploying the same, and then flattening the bars and bonds into the plane of the web.

12. The method of expanding the web of a beam having side flanges, which consists in slitting the web to form bars, then flattening the bars into the plane of the web, then elongating the bars, then laterally separating the flanges to deploy the bars, and then flattening the same into the plane of the web.

13. The method of expanding the web of a beam having side flanges, which consists in slitting the web to form bars with staggered connecting bonds, then flattening the same into the plane of the web, then stretching the bars by deflecting the bonds, then laterally separating the flanges to deploy the bars and bonds, and then flattening the same into the plane of the web.

14. The method of expanding the web of a beam having side flanges, which consists in slitting the web to form parallel bars with staggered connecting bonds, then flattening the same into the plane of the web, then stretching the bars by corrugating the bonds, then laterally separating the flanges to deploy the bars and bonds, and then flattening the same into the plane of the web.

15. The method of expanding the web of a structural shape or the like, which consists in performing the several operations set forth in claim 1, during a continuous progressive movement of the material.

16. The method of expanding the web of a structural shape or the like, which consists in performing the several operations set forth in claim 15, with the metal at a working heat.

17. The method of expanding the web of a flanged rolled shape which consists in slitting the web to form bars connected with each other and with the flanges by bonds, passing the slitted web through rolls to lengthen the bars, separating the flanges and flattening the bars to the plane of the web.

18. The method of expanding the web of a flanged rolled shape which consists in slitting the web to form bars, passing the slitted web through rolls to lengthen the bars, and separating the flanges to form open work.

HARRY M. NAUGLE.
ARTHUR J. TOWNSEND.